US006837302B2

(12) United States Patent
Spinner et al.

(10) Patent No.: US 6,837,302 B2
(45) Date of Patent: Jan. 4, 2005

(54) MECHANICAL CONTROL HEAD SYSTEM

(75) Inventors: Jacob A Spinner, Clawson, MI (US);
Douglas David Turner, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 11 days.

(21) Appl. No.: 10/402,005

(22) Filed: Mar. 28, 2003

(65) Prior Publication Data

US 2003/0183366 A1 Oct. 2, 2003

Related U.S. Application Data

(62) Division of application No. 09/667,848, filed on Sep. 22, 2000, now Pat. No. 6,626,232.

(51) Int. Cl.[7] .............................. H01H 3/02; B60H 1/00; H02B 1/048
(52) U.S. Cl. .............................. 165/43; 165/41; 165/76; 165/11.1; 74/500.5; 74/501.6; 454/69
(58) Field of Search .............................. 165/41, 42, 43, 165/11.1; 454/69; 74/500.5, 501.6

(56) References Cited

U.S. PATENT DOCUMENTS

| 3,902,152 | A |   | 8/1975  | Van Benthuysen |
|-----------|---|---|---------|----------------|
| 3,922,047 | A |   | 11/1975 | Tsuji          |
| 3,994,608 | A |   | 11/1976 | Swiderski et al. |
| 4,591,153 | A | * | 5/1986  | Krey           |
| 4,800,466 | A | * | 1/1989  | Bauer et al.   |
| 5,065,667 | A | * | 11/1991 | Ziegler        |
| 5,148,718 | A |   | 9/1992  | Kakuguchi et al. |
| 5,167,465 | A | * | 12/1992 | Inui et al.    |
| 5,185,804 | A | * | 2/1993  | Watanabe       |
| 5,245,886 | A | * | 9/1993  | Truesdell et al. .......... 74/501.6 |
| 5,433,126 | A | * | 7/1995  | Corbett        |
| 5,491,311 | A | * | 2/1996  | Muscat et al.  |
| 5,700,191 | A | * | 12/1997 | Nieling et al. ................ 454/69 |
| 5,735,543 | A |   | 4/1998  | Koppenstein et al. |
| 5,838,221 | A | * | 11/1998 | Jones, Jr. et al. |
| 5,924,332 | A | * | 7/1999  | Ozeki ........................ 74/500.5 |
| 6,281,453 | B1 | * | 8/2001 | Uleski         |
| 6,521,848 | B2 | * | 2/2003 | Shibata et al. |

FOREIGN PATENT DOCUMENTS

| DE | 4326910     |   | 2/1994  |
|----|-------------|---|---------|
| DE | 4340064     |   | 1/1995  |
| DE | 19517781    |   | 9/1996  |
| EP | 0590170     |   | 4/1994  |
| EP | 0 669217    |   | 8/1995  |
| EP | 0832772     | * | 4/1998  |
| GB | 2213644     | * | 8/1989  |
| JP | 5-193399    |   | 8/1993  |
| JP | 8-235970    |   | 9/1996  |
| JP | 8-310322 A  |   | 11/1996 |
| JP | 10-278549   |   | 10/1998 |
| JP | 2000-200112 |   | 7/2000  |
| JP | 2001-15958  |   | 1/2001  |
| JP | 2002-103948 | * | 4/2002  |
| JP | 2002-219927 |   | 8/2002  |

* cited by examiner

Primary Examiner—John K. Ford
(74) Attorney, Agent, or Firm—Stefan V. Chmielewski

(57) ABSTRACT

A mechanical control head system allows a vehicle user to control certain HVAC functions. The mechanical control head system includes a mounting plate, a faceplate, at least two user-adjustable actuators, at least two function interfaces and connections between the function interfaces and the HVAC module. The knobs provide the user a means to control, for example, the ambient temperature in the vehicle interior and the outside air circulation within the vehicle. The rotary cylinders can be coupled and uncoupled to the knobs in a single step instead of requiring individual steps for each knob.

21 Claims, 3 Drawing Sheets

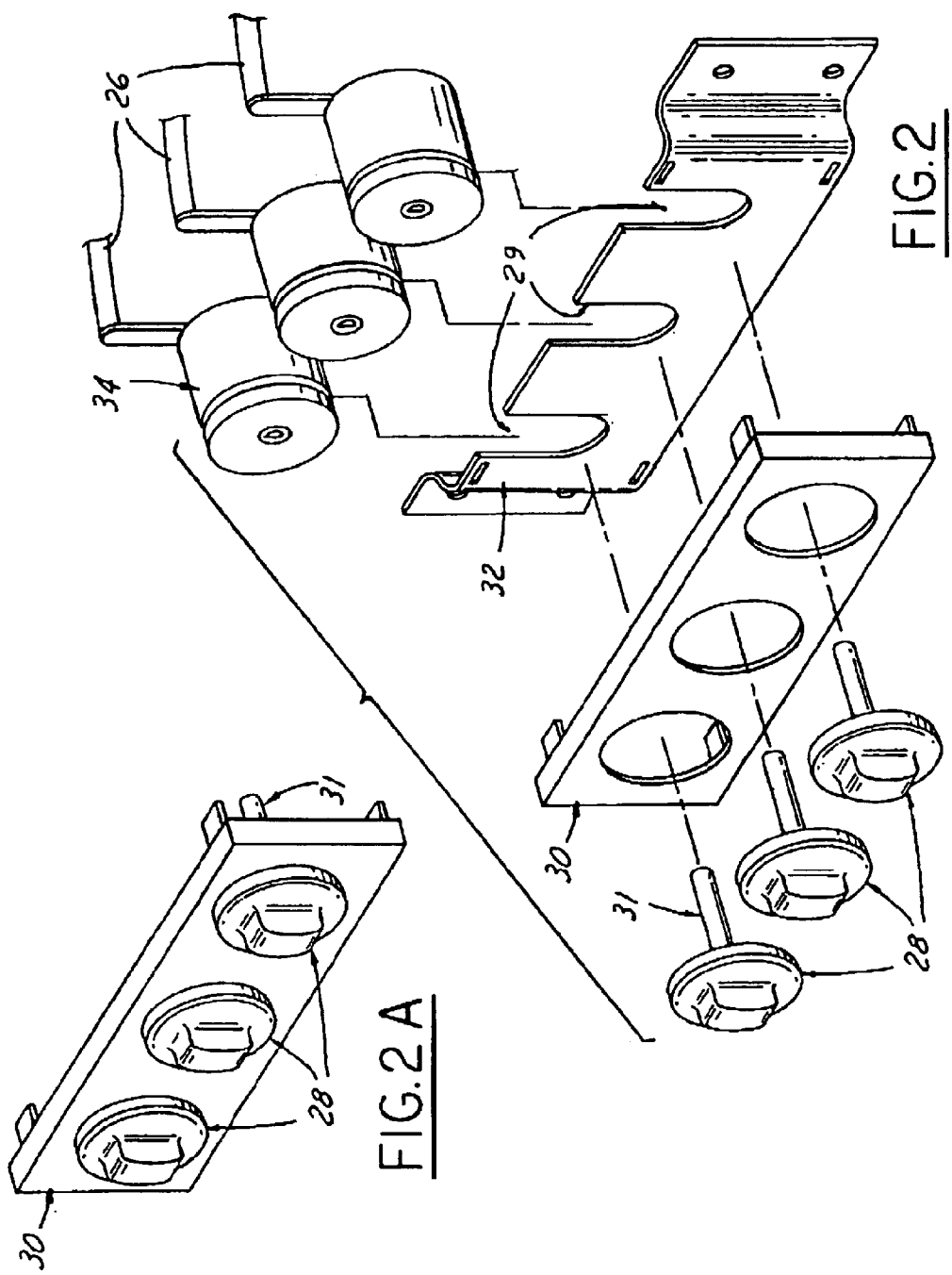

MECHANICAL CONTROL HEAD SYSTEM

This application is a divisional of U.S. application Ser. No. 09/667,848, filed on Sep. 22, 2000, now U.S. Pat. No. 6,626,232.

TECHNICAL FIELD

The present invention relates generally to assembly processes, and more particularly, to mechanical HVAC control head systems.

BACKGROUND OF THE INVENTION

Vehicle assembly plants often produce several hundred vehicles per day. This type of production demand places a significant burden on the plant assembly operators who must construct these vehicles. Not only must the assembly operators correctly assemble various types of component configurations, but they must also meet daily production goals. To maintain a competitive position, vehicle manufacturers strive to create innovations that reduce cost while maintaining quality. One such innovation is to reduce overall vehicle assembly time.

The installation of heating, ventilation and air-conditioning (HVAC) systems into vehicles inherently poses assembly problems. Assembly problems arise with HVAC systems because the user interface mechanisms, such as knobs or switches, typically are coupled individually to the system they control. These individual coupling requirements significantly slow vehicle assembly time and increase overhead costs.

An increasingly common approach to reduce overall vehicle assembly time is to require component manufacturers to pre-assemble as much of the components as possible. The pre-assembled components are then shipped to the vehicle assembly plant for installation in a vehicle. Because the assembly operators' time is not occupied as much by pre-assembly needs, the overall amount of time spent assembling the vehicle is reduced. This reduction in time directly impacts costs by reducing overhead and increasing the rate of production.

In HVAC systems where the user interfaces are mechanical, as when knobs are used, HVAC component manufacturers couple the HVAC module to a mounting plate, such as by use of push tabs, and deliver the sub-assembly to the vehicle assembly plant. During assembly, the assembly operators have to snap fit or otherwise affix the faceplate to the mounting plate and make the connections between the function interfaces, such as rotary cylinders, and the knobs by coupling one knob individually to each function interface.

The difficulty with assembling the HVAC system in the manner described above is that once installation is complete, the assembly operators do not know if the function interfaces are properly aligned, installed and operational. The assembly operators can verify the installation only by activating the entire HVAC system. The time the assembly operators take to activate the entire HVAC system slows overall vehicle assembly time.

These disadvantages the assembly operators encounter when installing HVAC systems have made it apparent that a new technique to install the user and function interfaces is needed. This new technique should adequately couple the function interfaces to the user interfaces in one step. The new technique also should also eliminate the need for the assembly operators to verify installation by activating the entire HVAC system. The present invention is directed to meeting these ends.

SUMMARY OF THE INVENTION

One object of the invention is to provide an improved and reliable means to install a mechanical control head system into a vehicle. Another object of the invention is to decrease the number of steps necessary to install the mechanical control head system. A third object of the invention is to improve the diagnostic capability of the overall HVAC system.

In one aspect of the invention, a vehicle has a mechanical control head system that controls certain HVAC functions. The mechanical control head system includes a mounting plate, a faceplate, at least two mechanical, user-adjustable actuators, such as knobs, and at least two function interfaces, such as rotary cylinders. If the mounting plate is integrated into the HVAC module, the mechanical control head system is coupled to the HVAC module and then the HVAC module is attached to the vehicle. If the mounting plate is not integrated into the HVAC module, the individual components of the mechanical control head must first be coupled to the mounting plate and then the mounting plate is attached to the HVAC module. The mounting plate can be attached to the vehicle in a variety of ways, such as by fastening the flanges on the mounting plate to the vehicle instrument panel using screws, bolts or other conventional fasteners. Next, at least two rotary cylinders are coupled to the mounting plate by sliding them into pre-cut, floating slots on the mounting plate. Then at least two knobs are coupled to the faceplate. The knobs allow the user a means to control, for example, the ambient temperature in the vehicle interior, whether outside air circulates in the vehicle, etc. In accordance with the present invention, the knobs are coupled to the rotary cylinders in a single step instead of requiring individual steps for each knob. Likewise, the knobs can be decoupled from the rotary cylinders in a single step. Finally the faceplate is coupled to the mounting plate. Because the knobs can be installed in one step, the assembly operator no longer has to activate the entire HVAC system to verify correct installation, which reduces the overall amount of time spent assembling the vehicle. Instead, the component manufacturer tests the HVAC module for correct operation before it is shipped to the vehicle assembly plant.

The present invention thus achieves an improved mechanical control head system for a vehicle. The present invention is advantageous because it reduces the number of steps required to install and uninstall the system. Additionally, the present invention reduces the length of rotary cylinder cable needed because of the simplified installation process. Finally, the present invention allows for a simplified diagnostics process to be performed on a malfunctioning HVAC module.

Additional advantages and features of the present invention will become apparent from the description that follows and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 2 is an exploded view of the mechanical control head system in accordance with one embodiment of the present invention;

FIG. 2A is a perspective view showing assembled elements of the mechanical control head system in FIG. 2;

DESCRIPTION OF THE PREFERRED EMBODIMENT(S)

In the following figures, the same reference numbers identify identical components in the various views. The present invention illustrates a mechanical control head system particularly suited for the automotive field. However, the present invention also applies to various other uses that may require a mechanical control head system.

Figure 1:
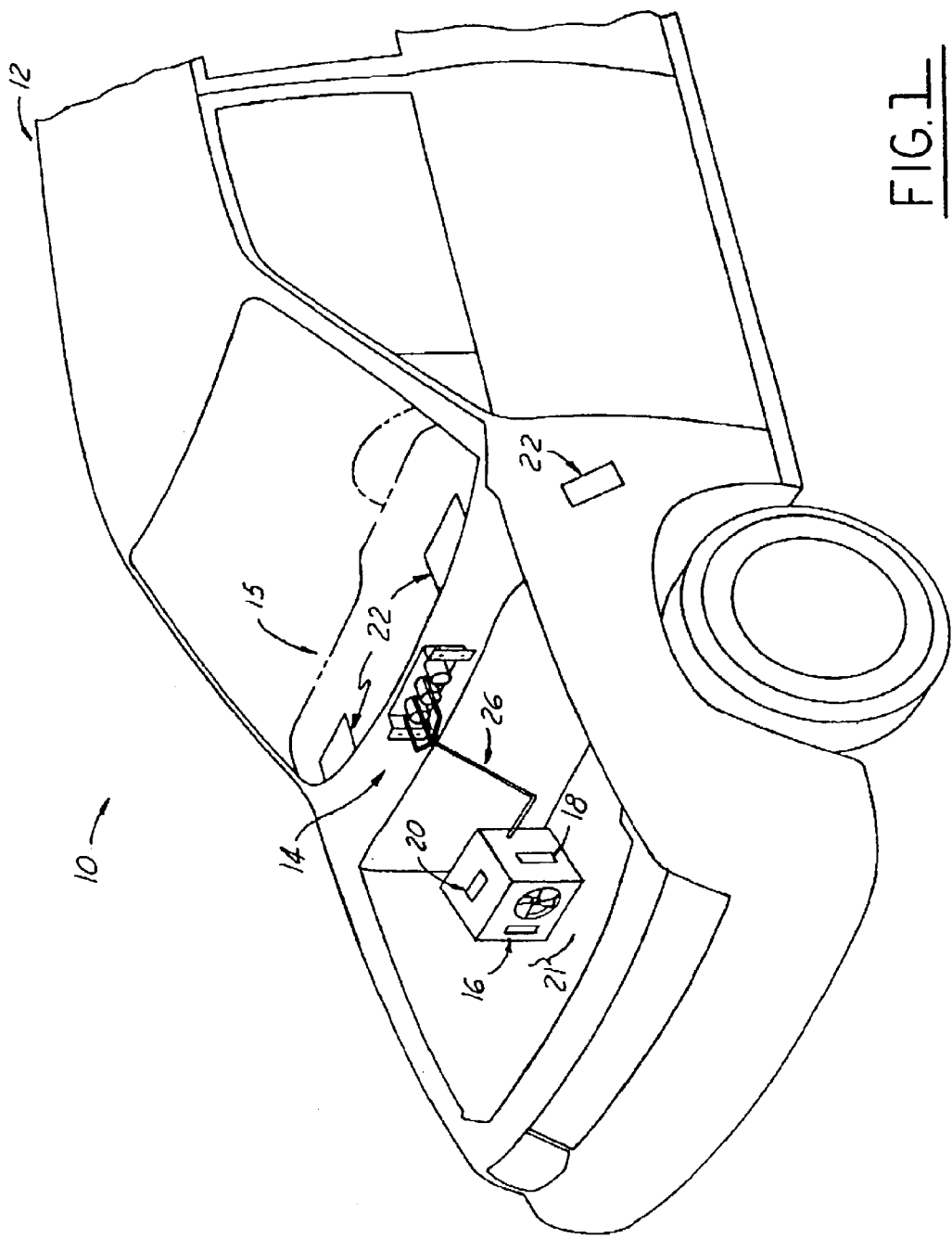
FIG. 1 schematically illustrates a vehicle incorporating a mechanical control head system in accordance with one embodiment of the present invention.

Referring to FIG. 1, an illustration of a vehicle 12 incorporating an automotive mechanical control head system 10 in accordance with one embodiment of the present invention is provided. The automotive mechanical control head system 10 has a mechanical control head system 14 located in an instrument panel 15. A vehicle occupant controls a number of systems and members, such as a recirculation door 16 that determines whether outside air circulates in the vehicle interior, a blend door 18 that allows a mixture of warm and cool air to enter the vehicle interior to control temperature, a mode door 20 that directs the mixture of warm and cool air to the opening(s) 22 in the vehicle interior and a fan 24 that moves air into the vehicle interior through any chosen opening 22, in the HVAC module 21 by using the mechanical control head system. Connections 26, such as a cable, pneumatic hose or electrical wire, link the mechanical control head system 14 to the recirculation door 16, the blend door 18, the mode door 20 and the fan 24.

Referring to FIG. 2, an exploded view of a mechanical control head system is illustrated. The embodiment of the present invention lends itself to a simplified installation process. Steps that illustrate an exemplary installation process for a mechanical control head system are explained in the following paragraphs. Note that the steps are merely one representation of many possible assembly configurations for the mechanical control head system in an automotive environment.

In accordance with one embodiment of the present invention, the mounting plate 32, if not already integrated into the HVAC module 21, is first attached to the HVAC module 21. The mounting plate 32 can be attached using a number of methods, such as snap fit (not shown). An example of snap fit is a fastener consisting of a ball and a socket, which are attached to opposed parts of an article and coupled to hold meeting edges together. Then, the knobs 28 are coupled, usually by the supplier before shipment to the vehicle assembly plant, to a faceplate 30 using a mechanism such as a push fit. An example of push fit is where parts are fitted together by an assembler using moderate hand pressure and tends to be used when occasional disassembly is expected.

One skilled in the art would realize that knobs 28 represent merely one type of the many mechanical user-adjusted actuators available. Once the knobs 28 are attached to the faceplate 30, the rotary cylinders 34 are adjusted to a set, fixed position that allows the tapered female D-receivers 33 to align with the male D-connectors 31. Again, one skilled in the art would realize that D-type connectors are merely one type of the many connectors available for use with the present application. Any conventional "keyed" type of interlocking or engaging connection can be used. Additionally, one skilled in the art would realize that rotary cylinders 34 are merely one form of a function interface and that any combination of electrical, mechanical or pneumatic interfaces can be utilized.

The rotary cylinders 34 slide into the floating slots 29 on the mounting plate 32. The connections 26 then are coupled on one end to the rotary cylinders 34. Next the knobs 28 are adjusted to a set, fixed position that allows the male D-connectors 31 to align with the tapered female D-receivers 33. With the present invention, a plurality of knobs 28 can be coupled to the rotary cylinders 34 in a single step instead of separate steps for each knob as currently realized in the art. Finally, the faceplate 30 positively locks to the mounting plate 32, using a mechanism such as snap fit.

Figure 3A:
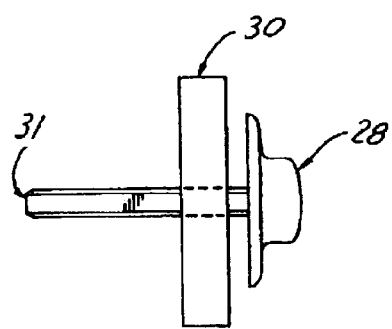
FIGS. 3A and 3B depict an exemplary male D-connector used with a knob in accordance with one embodiment of the present invention.
Figure 3B:
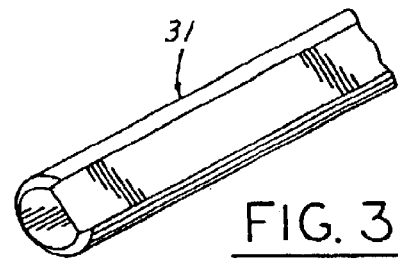

Referring to FIGS. 3A and 3B, a cross-sectional view of the knob 28, the faceplate 30 and a male D-connector 31 is illustrated. One skilled in the art would realize the knob 28 could have either a male or female connector of some type as long as the knob's connector corresponds to the fitting on the rotary cylinder.

Figure 4A:
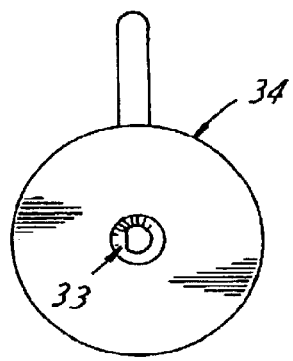
FIGS. 4A and 4B depict a mating exemplary female D-receiver used with a rotary cylinder in accordance with one embodiment of the present invention.

Referring to FIG. 4A, a front view of a rotary cylinder 34 is illustrated. One skilled in the art would realize the rotary cylinder 34 could have either a male or female connector of some type as long as the rotary cylinder's connector corresponds to the fitting on the knob 28. The rotary cylinder 34 in the present embodiment of the invention a tapered female D-receiver 33.

Figure 4B:
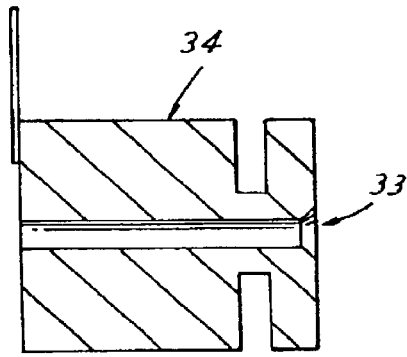

Referring to FIG. 4B, a cross-sectional view of the rotary cylinder 34 is illustrated. The funneling action of the tapered female D-receiver 33 permits faster assembly time. The taper allows for easier insertion of a male D-connector 31 because the male D-connector 31 need not be in perfect alignment with the tapered female D-receiver 33 for to make the connection.

From the foregoing, a new and improved mechanical control head system is brought to the art. The preferred embodiment's preceding description merely illustrates one of the many specific applications of the principles utilized in the present invention. Clearly, numerous and other arrangements can be evident to those skilled in the art without departing from the scope of the invention as defined by the following claims:

What is claimed is:

1. A mechanical control head system comprising:
   a mounting plate;
   a faceplate adapted to be detachably coupled to said mounting plate;
   at least two mechanical, user-adjustable actuators coupled to said faceplate; and
   at least two mechanical control head elements, wherein said at least two mechanical control head elements are coupled to floating slots on said mounting plate and correspondingly detachably coupled to said at least two mechanical, user-adjustable actuators, whereby when said faceplate is attached to said mounting plate, said at least two mechanical user-adjustable actuators simultaneously couple to said at least two mechanical control head elements.

2. The system as recited in claim 1 wherein said mounting plate is integrated into an HVAC module.

3. The system as recited in claim 1 wherein said at least two user-adjustable actuators include knobs.

4. The system as recited in claim 1 wherein said at least two mechanical control head elements include rotary cylinders.

5. The system as recited in claim 1 wherein said at least two mechanical user-adjustable actuators possess male D-connectors and are coupled to said at least two mechanical control head elements which include female D-receivers.

6. The system as recited in claim 5 wherein said female D-receivers are tapered.

7. The system as recited in claim 1 wherein said at least two mechanical user-adjustable actuators possess female D-receivers and are coupled to said at least two rotary cylinders correspond to at least two mechanical control head elements that include male D-connectors.

8. The system as recited in claim 7 wherein said female D-receivers are tapered.

9. An automotive mechanical control head system comprising:
- a vehicle having HVAC functionality;
- an HVAC system located in said vehicle controlled by said automotive mechanical control head system;
- a mounting plate used to attach said automotive mechanical control head system to said vehicle;
- a faceplate adapted to be detachably coupled to said mounting plate;
- at least two mechanical, user-adjustable actuators coupled to said faceplate whereby said user-adjustable actuators provide a user with the ability to manipulate an ambient temperature within said vehicle; and
- at least two mechanical control head elements, wherein said at least two mechanical control head elements are attached to floating slots on said mounting plate and correspondingly detachably coupled to said at least two mechanical, user-adjustable actuators, whereby when said faceplate is attached to said mounting plate, said at least two mechanical user-adjustable actuators are simultaneously attached to said at least two function interfaces.

10. The system as recited in claim 9 further comprising at least one opening through which air is circulated within said vehicle.

11. The system as recited in claim 9 further comprising at least one mode door through which air is directed to at least one specific location within said vehicle through an opening.

12. The system as recited in claim 9 further comprising a recirculation door through which air external to said vehicle is allowed to flow into said vehicle.

13. The system as recited in claim 9 further comprising at least one blend door, controlled by one of said at least two mechanical control head elements, by which hot air blends with cooler air to control said ambient temperature within said vehicle.

14. The system as recited in claim 9 further comprising a fan controlled by one of said at least two mechanical control head elements by which air is blown into said vehicle through an opening.

15. The system as recited in claim 9 wherein said mounting plate is integrated into an HVAC module.

16. The system as recited in claim 9 wherein said at least two user-adjustable actuators are knobs.

17. The system as recited in claim 9 wherein said at least two mechanical control head elements are rotary cylinders.

18. The system as recited in claim 9 wherein said at least two mechanical user-adjustable actuators include male D-connectors and are coupled to said at least two mechanical control head elements which include female D-receivers.

19. The system as recited in claim 18 wherein said female D-receivers are tapered.

20. The system as recited in claim 9 wherein said at least two mechanical user-adjustable actuators include female D-receivers and are coupled to said at least two rotary cylinders that include male D-connectors.

21. The system as recited in claim 20 wherein said female D-receivers are tapered.

* * * * *